United States Patent
Chen et al.

(10) Patent No.: US 9,645,447 B2
(45) Date of Patent: May 9, 2017

(54) LCOS DISPLAY APPARATUS

(71) Applicant: Himax Display, Inc., Tainan (TW)

(72) Inventors: Wen-Hsu Chen, Tainan (TW); Yuet-Wing Li, Tainan (TW)

(73) Assignee: HIMAX DISPLAY, INC., Tainan (TW)

( * ) Notice: Subject to any disclaimer, the term of this patent is extended or adjusted under 35 U.S.C. 154(b) by 124 days.

(21) Appl. No.: 14/518,375

(22) Filed: Oct. 20, 2014

(65) Prior Publication Data

US 2016/0109737 A1 Apr. 21, 2016

(51) Int. Cl.
*G02F 1/1362* (2006.01)
*G02F 1/1335* (2006.01)
*G02F 1/1337* (2006.01)
*G02F 1/1343* (2006.01)

(52) U.S. Cl.
CPC .. *G02F 1/133784* (2013.01); *G02F 1/133553* (2013.01); *G02F 1/134336* (2013.01); *G02F 1/136277* (2013.01); *G02F 2001/133746* (2013.01); *G02F 2201/52* (2013.01)

(58) Field of Classification Search
CPC ......... G02F 1/136277; G02F 1/133553; G02F 1/133345; G02F 2001/133746; G02F 1/134336
See application file for complete search history.

(56) References Cited

U.S. PATENT DOCUMENTS

| 2004/0234690 | A1* | 11/2004 | Hiruma | G02F 1/1341 427/256 |
| 2004/0252265 | A1* | 12/2004 | Ma | G02F 1/133707 349/130 |
| 2005/0162591 | A1* | 7/2005 | Hashimoto | G02F 1/133502 349/113 |
| 2006/0087612 | A1* | 4/2006 | Kuan | C09K 19/60 349/165 |
| 2009/0109383 | A1* | 4/2009 | Tsai | G02F 1/133514 349/106 |

(Continued)

FOREIGN PATENT DOCUMENTS

| TW | I281582 B | 5/2007 |
| TW | 200837458 A | 9/2008 |
| TW | 201109781 A | 3/2011 |

*Primary Examiner* — Paul Lee
*Assistant Examiner* — Jia Pan
(74) *Attorney, Agent, or Firm* — Locke Lord LLP; Tim Tingkang Xia, Esq.

(57) ABSTRACT

A liquid crystal on silicon (LCOS) display apparatus is provided, which includes a silicon substrate, a color filter layer, a first alignment layer, a second alignment layer and a liquid crystal layer. The silicon substrate has pixels arranged in a matrix. Each of the pixels has a tilting angle ranging from about 0 degrees to about 90 degrees and includes a pixel electrode. The color filter layer is disposed on the pixels. The color filter layer has a plurality of color filter units, and each of the color filter units respectively corresponds to one of the pixel electrodes. The first alignment layer is disposed on the color filter layer. The second alignment layer is disposed opposite to the first alignment layer. The liquid crystal layer is disposed between the first alignment layer and the second alignment layer. The liquid crystal layer has liquid crystal molecules with negative dielectric anisotropy.

12 Claims, 5 Drawing Sheets

(56) References Cited

U.S. PATENT DOCUMENTS

| | | | |
|---|---|---|---|
| 2009/0168005 A1* | 7/2009 | Kim | G02F 1/133707 349/144 |
| 2011/0051054 A1* | 3/2011 | Wang | G02F 1/136277 349/106 |
| 2013/0258262 A1* | 10/2013 | Lee | G02F 1/133707 349/123 |
| 2014/0009731 A1* | 1/2014 | O'Callaghan | G02F 1/133553 349/114 |

* cited by examiner

LCOS DISPLAY APPARATUS

BACKGROUND

Field of Disclosure

The invention relates to a liquid crystal on silicon (LCOS) display apparatus, and more particularly, to a LCOS display apparatus with designation of rubbing angles, pitches of liquid crystal molecules and pixels thereof.

Description of Related Art

Nowadays, various kinds of projective display devices, such as liquid crystal display (LCD) display devices, digital light processing (DLP) display devices and liquid crystal on silicon (LCOS) display devices, are commercially available. Among these display devices, the LCD display devices operate in a transmissive way, while the DLP display devices and the LCOS display devices operate in a reflective way. LCD display devices are the oldest the most popular, and have advantages such as high colour accuracy and low manufacture cost. However, LCD display devices have disadvantages of dead pixels and screen door effect, which degrades display performance. DLP display devices have advantages such as high contrast ratio and immune to color decay. However, DLP display devices are relatively expensive. LCOS display devices involves techniques of the typical LCD panel and complementary metal-oxide semiconductor (CMOS) processes. LCOS display devices can achieve high resolution, high color saturation and accuracy and can be manufactured by semiconductor processes. With such advantages, LCOS display devices are applied in electronic devices such as micro-projectors, monitors or head mounted displays.

SUMMARY

The invention provides a LCOS display apparatus with designation of rubbing angles, pitches of liquid crystal molecules and pixels thereof for achieving high display performance in accordance with various demands.

An aspect of the invention is to provide a liquid-crystal-on-silicon (LCOS) display apparatus. The LCOS display apparatus includes a silicon substrate, a color filter layer, a first alignment layer, a second alignment layer and a liquid crystal layer. The silicon substrate has pixels arranged in a matrix. Each of the pixels has a tilting angle ranging from about 0 degrees to about 90 degrees, and each of the pixels includes a pixel electrode. The color filter layer is disposed on the plurality of pixels. The color filter layer has a plurality of color filter units, and each of the color filter units respectively corresponds to one of the plurality of pixel electrodes. The first alignment layer is disposed on the color filter layer. The second alignment layer is disposed opposite to the first alignment layer. The liquid crystal layer is disposed between the first alignment layer and the second alignment layer. The liquid crystal layer has a plurality of liquid crystal molecules with negative dielectric anisotropy.

In one or more embodiments, the tilting angle of each of the pixels ranges from about 75 degrees to about 90 degrees.

In one or more embodiments, the tilting angle of each of the pixels is about 90 degrees.

In one or more embodiments, each of the liquid crystal molecules has a beta angle of about 45 degrees.

In one or more embodiments, each of the liquid crystal molecules has a beta angle of about 15 degrees.

In one or more embodiments, each of the liquid crystal molecules has a twist angle of about 45 degrees.

In one or more embodiments, each of the liquid crystal molecules has a twist angle of about 0 degrees.

In one or more embodiments, each of the liquid crystal molecules has a pitch ranging from about 20 microns to about 100 microns.

In one or more embodiments, the LCOS display apparatus further includes a reflective layer and a dielectric layer. The reflective layer is disposed on the silicon substrate. The dielectric layer is disposed between the reflective layer and the pixel electrodes.

In one or more embodiments, the LCOS display apparatus further includes a common electrode layer and a transparent substrate. The common electrode layer is disposed on the second alignment layer. The transparent substrate is disposed on the common electrode layer.

Another aspect of the invention is to provide a liquid-crystal-on-silicon (LCOS) display apparatus. The LCOS display apparatus includes a silicon substrate, a first alignment layer, a second alignment layer and a liquid crystal layer. The silicon substrate has pixels arranged in a matrix. Each of the pixels has a tilting angle ranging from about 0 degrees to about 90 degrees, and each of the pixels includes a pixel electrode. The first alignment layer is disposed on the pixels. The second alignment layer is disposed opposite to the first alignment layer. The liquid crystal layer is disposed between the first alignment layer and the second alignment layer. The liquid crystal layer has a plurality of liquid crystal molecules with negative dielectric anisotropy.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, the disclosure will be explained with reference to embodiments thereof. However, these embodiments are not intended to limit the disclosure to any specific environment, applications or particular implementations described in these embodiments. Therefore, the description of these embodiments is only for the purpose of illustration rather than to limit the disclosure. In the following embodiments and attached drawings, elements not directly related to the disclosure are omitted from depiction; and the dimensional relationships among individual elements in the attached drawings are illustrated only for ease of understanding, but not to limit the actual scale.

It will be understood that, although the terms "first" and "second" may be used herein to describe various elements, components, regions, layers and/or sections, these elements, components, regions, layers and/or sections should not be limited by these terms. These terms are only used to distinguish one element, component, region, layer or section from another.

Figure 1:
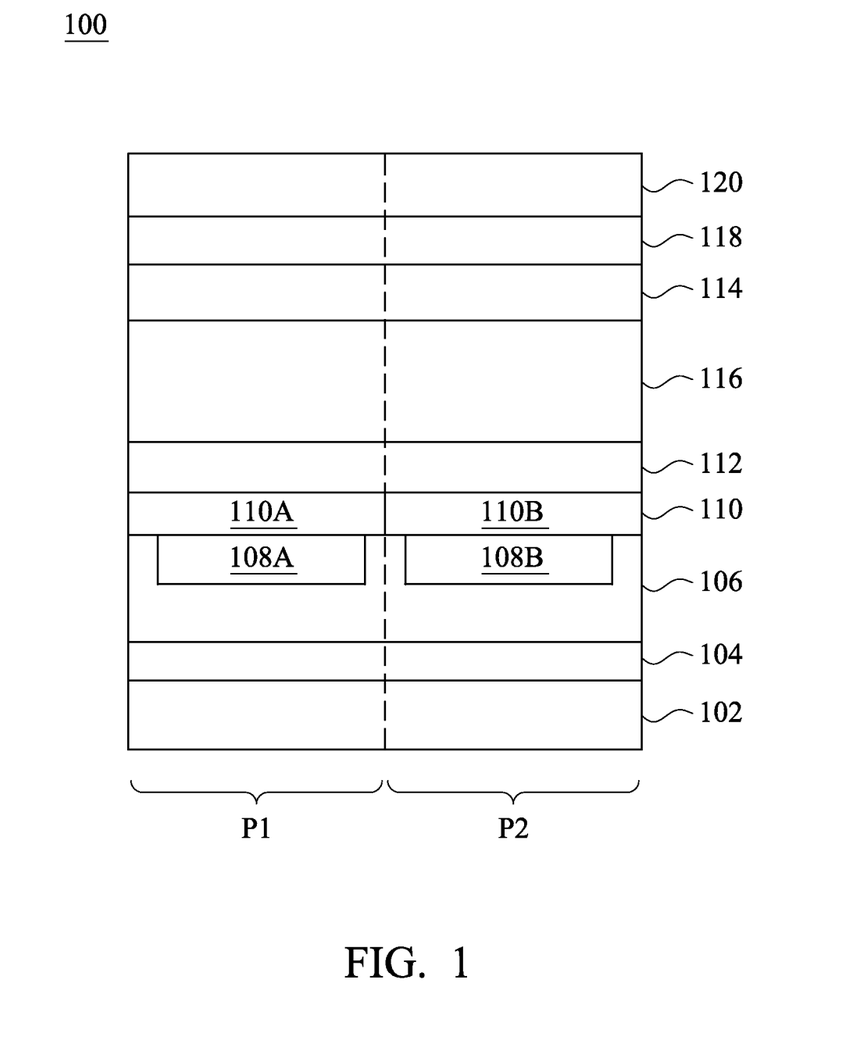
FIG. 1 is a local cross-sectional view of a LCOS display apparatus in accordance with some embodiments.

FIG. 1 illustrates a local cross-sectional view of a LCOS display apparatus 100 in accordance with some embodiments. In FIG. 1, the LCOS display apparatus 100 includes a silicon substrate 102, a reflective layer 104, a dielectric layer 106, pixel electrodes 108A, 108B, a color filter layer 110, a first alignment layer 112, a second alignment layer 114, a liquid crystal layer 116, a common electrode layer 118 and a transparent substrate 120. The silicon substrate 102 has pixels arranged in a matrix. Each pixel may correspond to a specific color. In some embodiments, the pixels include red pixels, blue pixels and green pixels. The red pixels, blue pixels and green pixels are sometimes referred to as sub-pixels. Three sub-pixels, which are respectively a red pixel, a blue pixel and a green pixel, form a full pixel for emitting light containing red, blue and green components with respective gray scales. For illustration, the silicon substrate 102 is a CMOS silicon wafer including active components such at transistors and circuits. It is noted that, FIG. 1 only illustrates two pixels P1 and P2 for convenient description, but is not meant to limit the scope of the invention.

The reflective layer 104 is disposed on the silicon substrate 102. The reflective layer 104 reflects light incident into the LCOS display apparatus 100. In some embodiments, the reflective layer 104 includes a metal material such as copper, aluminum, titanium, tantalum, nickel, gold, zinc, or a metal alloy containing the above metals, or a metal compound such as aluminum oxide, titanium oxide, titanium nitride, zinc oxide, or other suitable material. In some embodiments, the reflective layer 104 is a reflective film or a reflective coating formed on the silicon substrate 102.

The dielectric layer 106 is disposed on the reflective layer 104, and the pixel electrodes 108A, 108B are formed on the dielectric layer 106. The dielectric layer 106 is used for insulating the pixel electrodes 108A, 108B from the reflective layer 104 and the silicon substrate 102, penetrating a portion of incident light unreflected by the pixel electrodes 108A, 108B, and penetrating reflected light from the portion of incident light reflected by the reflective layer 104. The dielectric layer 106 includes a dielectric material, such as silicon oxide, silicon nitride, silicon oxynitride, combinations thereof, or other suitable material.

The pixel electrodes 108A, 108B are used for providing pixel voltages, such that the pixels P1, P2 display with respective gray levels based on the respective pixel voltages. The pixel electrodes 108A, 108B may be reflective or transparent. In some embodiments, the pixel electrodes 108A, 108B are reflective electrodes including a material such as aluminum, titanium, copper, gold, or the like. In some embodiments, the pixel electrodes 108A, 108B are transparent electrodes including a material such as indium tin oxide (ITO), indium zinc oxide (IZO), or other suitable conductive material.

The color filter layer 110 is disposed on the pixel electrodes 108A, 108B. The color filter layer 110 has a plurality of color filter units, and each of the color filter units respectively corresponds to one of the plurality of pixel electrodes for passing light with a specific color. In some embodiments, the color filter layer 110 includes a dyed or pigmented material such as polymer, or other suitable material.

The first alignment layer 112 is disposed on the color filter layer 110, and the second alignment layer 114 is disposed opposite to the first alignment layer 112, and the liquid crystal layer 116 is disposed between the first alignment layer 112 and the second alignment layer 114. The liquid crystal layer 116 has liquid crystal molecules aligned by the first alignment layer 112 and the second alignment layer 114 and twisted in response to an electric field generated between the pixel electrodes 108A, 108B and the common electrode layer 118 disposed on the second alignment layer 114. The first alignment layer 112 and the second alignment layer 114 may be formed have respective rubbing directions. Each of the liquid crystal molecules in the liquid crystal layer 116 has a beta angle and a twist angle. The beta angle is relative to the rubbing direction of the second alignment layer 114 and a horizontal direction of the LCOS display apparatus 100, while the twist angle is relative to the rubbing directions of the first alignment layer 112 and the second alignment layer 114. In this embodiment, the liquid crystal molecules of the liquid crystal layer 116 are negative dielectric anisotropy for vertical alignment. That is, the LCOS display apparatus 100 is a vertical alignment (VA) mode LCOS display apparatus.

The common electrode layer 118 includes a transparent and conductive material such as ITO, IZO, or other suitable material. The transparent substrate 120 is disposed on the common electrode layer 118 for receiving incident light and protecting the internal components of the LCOS display apparatus 100 such as the common electrode layer 118 and the liquid crystal layer 116. In some embodiments, the transparent substrate 120 includes a transparent material such as glass, silicon dioxide, or the like.

Figure 2A:
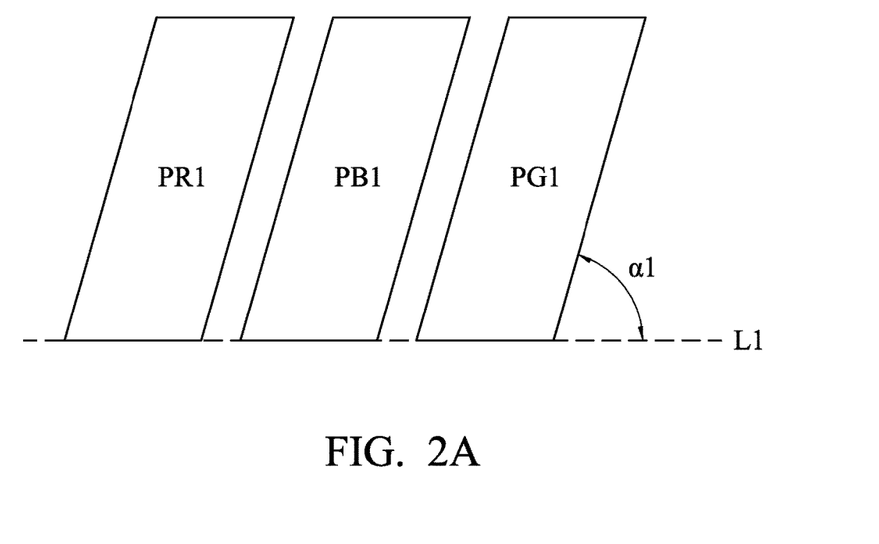
FIGS. 2A-2C illustrate top views of various pixel arrangements of the LCOS display apparatus in FIG. 1.

FIG. 2A illustrates a top view of a pixel arrangement of the LCOS display apparatus 100 in FIG. 1. In FIG. 2A, the pixels PR1, PB1, PG1 represent three adjacent pixels of the LCOS display apparatus 100, and are arranged in an aligned stripe pattern. In some embodiments, the pixels PR1, PB1, PG1 are a red pixel, a blue pixel and a green pixel, respectively. Each of the pixels PR1, PB1, PG1 has a tilting angle $\alpha 1$ relative to a virtual baseline L1 in the horizontal direction of the LCOS display apparatus 100 ranging from about 0 degrees to about 90 degrees. In some embodiments, the tilting angle $\alpha 1$ ranges from about 75 degrees to about 90 degrees.

Figure 2B:
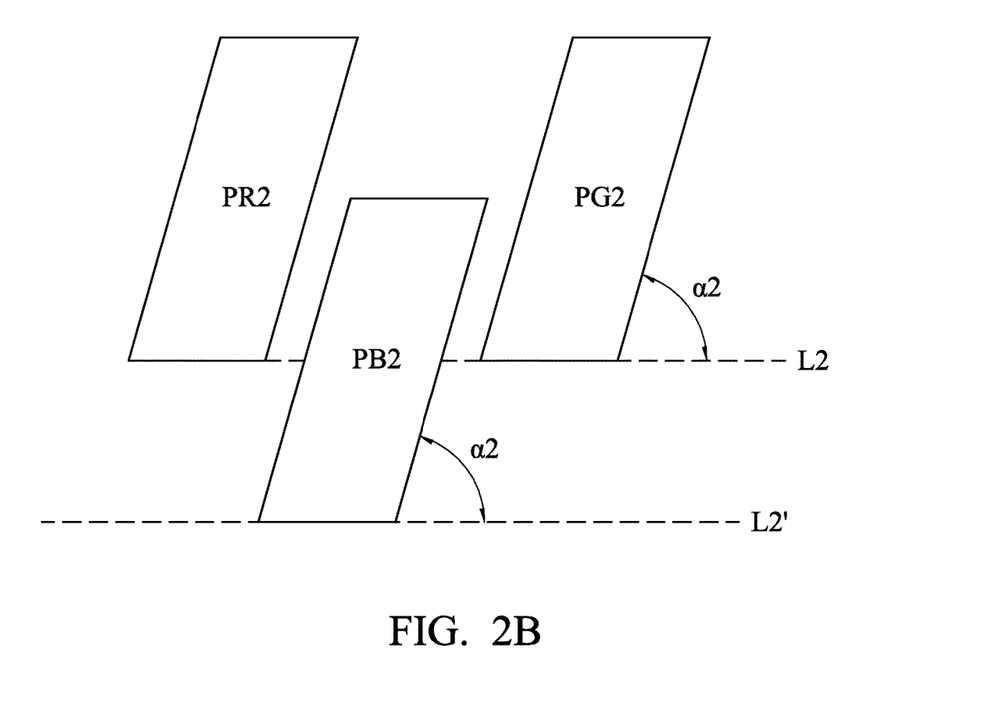

FIG. 2B illustrates a top view of another pixel arrangement of the LCOS display apparatus 100 in FIG. 1. In FIG. 2B, the pixels PR2, PB2, PG2 represent three adjacent pixels of the LCOS display apparatus 100, and are arranged in a staggered pattern. In some embodiments, the pixels PR2, PB2, PG2 are a red pixel, a blue pixel and a green pixel, respectively. Each of the pixels PR2, PB2, PG2 has a tilting angle $\alpha 2$ relative to a virtual baselines L2 or L2' in the horizontal direction of the LCOS display apparatus 100 ranging from about 0 degrees to about 90 degrees, and a lengthwise direction of each of the pixels PR2, PB2, PG2 is parallel to the horizontal direction of the LCOS display apparatus 100. In some embodiments, the tilting angle $\alpha 2$ ranges from about 75 degrees to about 90 degrees.

Figure 2C:
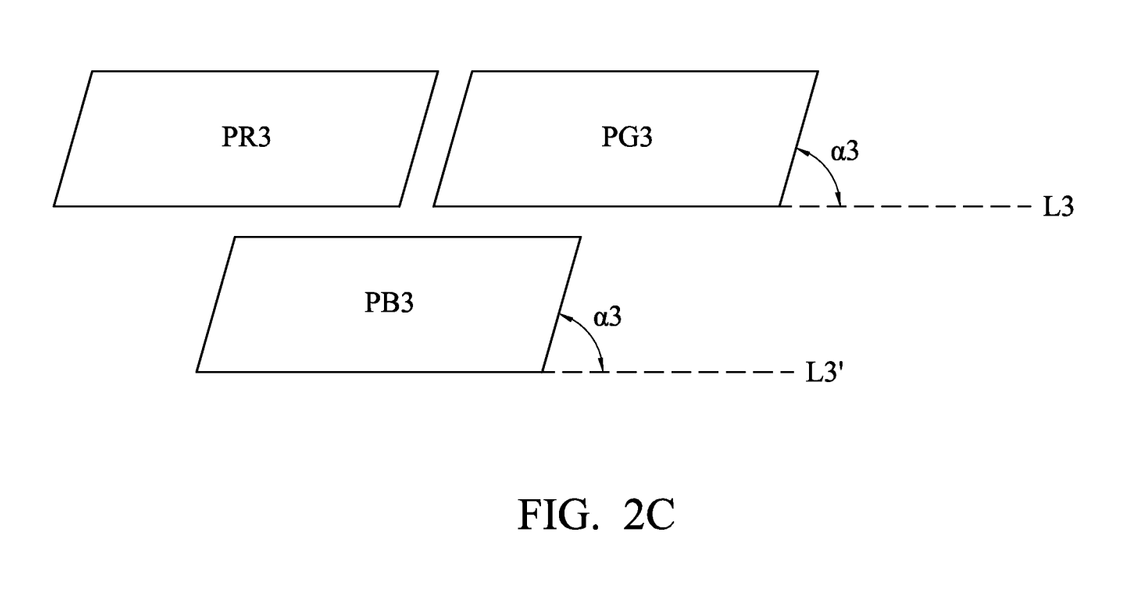

FIG. 2C illustrates a top view of another pixel arrangement of the LCOS display apparatus 100 in FIG. 1. In FIG. 2C, the pixels PR3, PB3, PG3 represent three adjacent pixels of the LCOS display apparatus 100. In some embodiments, the pixels PR3, PB3, PG3 are a red pixel, a blue pixel and a green pixel, respectively. Each of the pixels PR3, PB3, PG3 has a tilting angle $\alpha 2$ relative to virtual baselines L3 and L3' in a horizontal direction of the LCOS display apparatus 100 ranging from about 0 degrees to about 90 degrees, and a lengthwise direction of each of the pixels PR3, PB3, PG3 is perpendicular to the horizontal direction of the LCOS display apparatus 100. In some embodiments, the tilting angle α3 ranges from about 75 degrees to about 90 degrees.

In the following, TABLE 1 lists simulation results of the LOCS display apparatus 100 with stripe arrangement (as illustrated in FIG. 2A) of the pixels P1, P2, cell gap of 2 microns, various twist angles, beta angles and pitches of the liquid crystal molecules and various tilting angles of the pixels. In TABLE 1, R represents the brightness when the LCOS display apparatus 100 is in a bright state, D represents the brightness when the LCOS display apparatus 100 is in a dark state, CR represents the maximum contrast ratio, CWR represents the color to white ratio (CW ratio) which is defined as the ratio of the summation of the red, green and blue values to the white value, CWR(CR1000) represents the CW ratio when the contrast of the LCOS display apparatus 100 is 1000, and RV represents a rating value of the LCOS display apparatus 100, which is obtained form the equation RV=CR×CWR×CWR(CR1000).

TABLE 1

| Beta Angle (°) | Twist Angle (°) | Tilting Angle (°) | Pitch (μm) | R | D | CR | CWR (%) | CWR(CR1000) (%) | RV |
|---|---|---|---|---|---|---|---|---|---|
| 45 | 0 | 90 | 50 | 50.09 | 0.013 | 3852.9 | 38.2 | 42.4 | 624.7 |
| 45 | 0 | 90 | 100 | 49.52 | 0.013 | 3809.0 | 38.1 | 42.1 | 610.8 |
| 15 | 45 | 85 | ∞ | 54.15 | 0.013 | 4165.4 | 34.9 | 40.3 | 586.3 |
| 15 | 45 | 90 | 100 | 58.78 | 0.014 | 4198.8 | 33.6 | 41.4 | 585.1 |
| 45 | 0 | 85 | 50 | 50.93 | 0.014 | 3637.6 | 37.0 | 42.8 | 575.5 |
| 45 | 0 | 85 | 40 | 47.03 | 0.013 | 3617.4 | 37.8 | 41.9 | 572.9 |
| 15 | 45 | 85 | 50 | 56.02 | 0.014 | 4001.2 | 34.2 | 41.4 | 566.1 |
| 15 | 45 | 85 | 100 | 59.71 | 0.014 | 4264.9 | 32.1 | 40.6 | 556.6 |
| 15 | 45 | 90 | ∞ | 52.86 | 0.014 | 3775.8 | 35.5 | 40.1 | 538.2 |
| 15 | 45 | 90 | 50 | 53.53 | 0.015 | 3568.6 | 33.7 | 39.9 | 479.9 |

As listed in TABLE 1, when the beta angle is 45 degrees, the twist angle is 0 degrees, the tilting angle is 90 degrees and the pitch is 50 microns, the CW ration CWR and the rating value RV are highest. The maximum contrast ratio CR with the beta angle of 15 degrees and the twist angle of 45 degrees is higher than that with the beta angle of 45 degrees and the twist angle of 0 degrees. On the other side, CWR (CR1000) with the beta angle of 45 degrees and the twist angle of 0 degrees is higher than that with the beta angle of 15 degrees and the twist angle of 45 degrees. Thus, the LCOS display apparatus 100 with the beta angle of 15 degrees and the twist angle of 45 degrees, or with the beta angle of 45 degrees and the twist angle of 0 degrees, in combination with the tilting angle of 90 degrees and 85 degrees may improve the display performance with a suitable pitch of the liquid crystal molecules.

Figure 3:
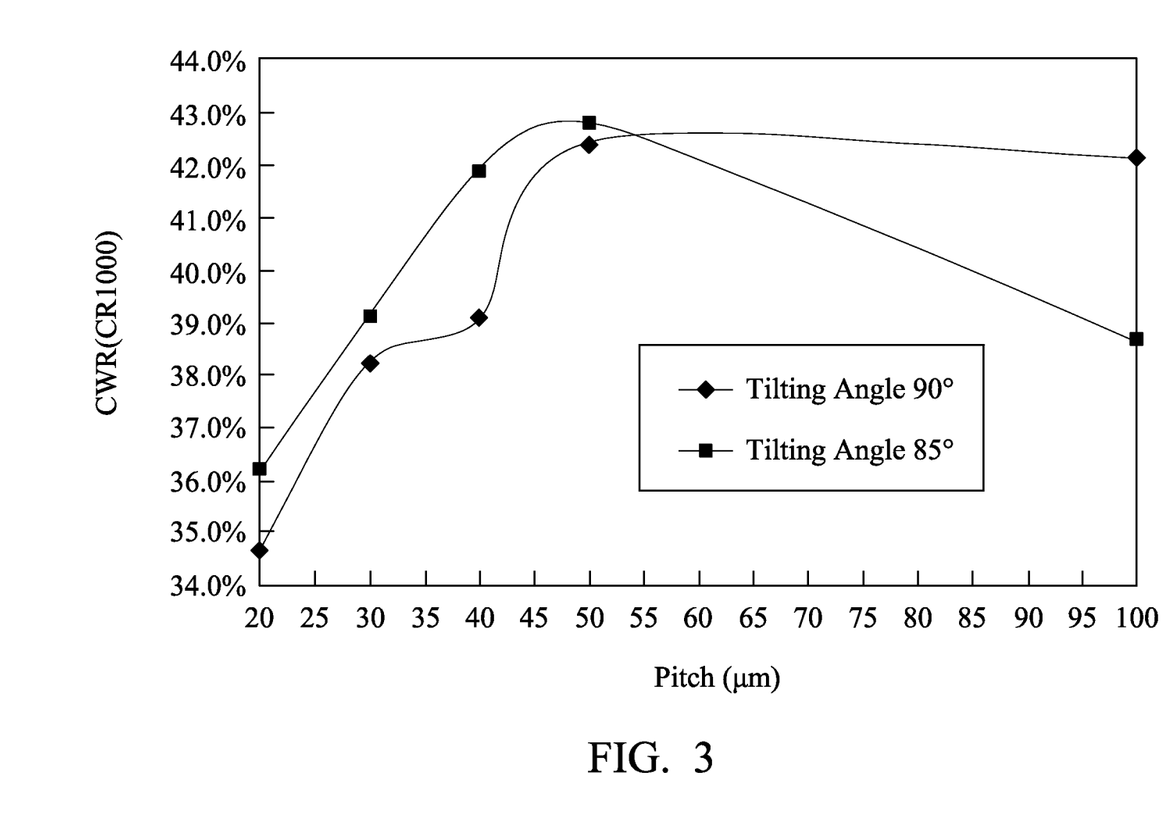
FIG. 3 shows the relationship between the pitch of the liquid crystal molecules and the CW ratio when the contrast ratio the LCOS display apparatus in FIG. 1 is 1000.

FIG. 3 shows the relationship between the pitch of the liquid crystal molecules and the CW ratio when the contrast ratio of the LCOS display apparatus 100 is 1000 (CR1000). As shown in FIG. 3, for both 90-degree and 85-degree tilting angles, the LCOS display apparatus 100 has the highest CW ratio of CR1000 with the pitch ranging from about 45 microns to about 55 microns (μm). Moreover, the stability of the LCOS display apparatus 100 with 90-degree tilting angle is better than that with 85-degree tilting angle, for that the variation of CR1000 of the LCOS display apparatus 100 with 90-degree tilting angle is smaller than that of the LCOS display apparatus 100 with 85-degree tilting angle when the pitch of the liquid crystal molecules of the LCOS display apparatus 100 ranges from about 20 microns to about 100 microns.

TABLE 2 lists simulation results of the LOCS display apparatus 100 with various tilting angles and pitches. As shown in TABLE 2, for both 90-degree tilting angle and 85-degree tilting angle along with pitches of 45, 50 and 55 microns, the CW ratios of CR1000 are greater than 40%, and the variations of 90-degree tilting angle and 85-degree tilting angle do not exceed 1%.

TABLE 2

|  | Tilting Angle (°) | | | | | |
|---|---|---|---|---|---|---|
|  | 90 | | | 85 | | |
| Pitch (μm) | 45 | 50 | 55 | 45 | 50 | 55 |
| CWR(CR1000) (%) | 41.30 | 42.41 | 42.50 | 43.50 | 43.34 | 43.00 |
| Variation (%) |  | 1.0 |  |  | 0.5 |  |

As illustrated in FIG. 3 and listed in TABLE 2, the LCOS display apparatus 100 may have the best performance with the pitch of the liquid crystal molecules ranging from about 45 microns to about 55 microns.

Thus, by referring to the embodiments of the invention, parameters of a LCOS display apparatus, such as tilting angle, liquid crystal pitch, cell gap, pixel tilting angle and/or rubbing angle, may be determined for achieving high display performance (e.g. high contrast ratio and high CW ratio) in accordance with various demands.

Figure 4:
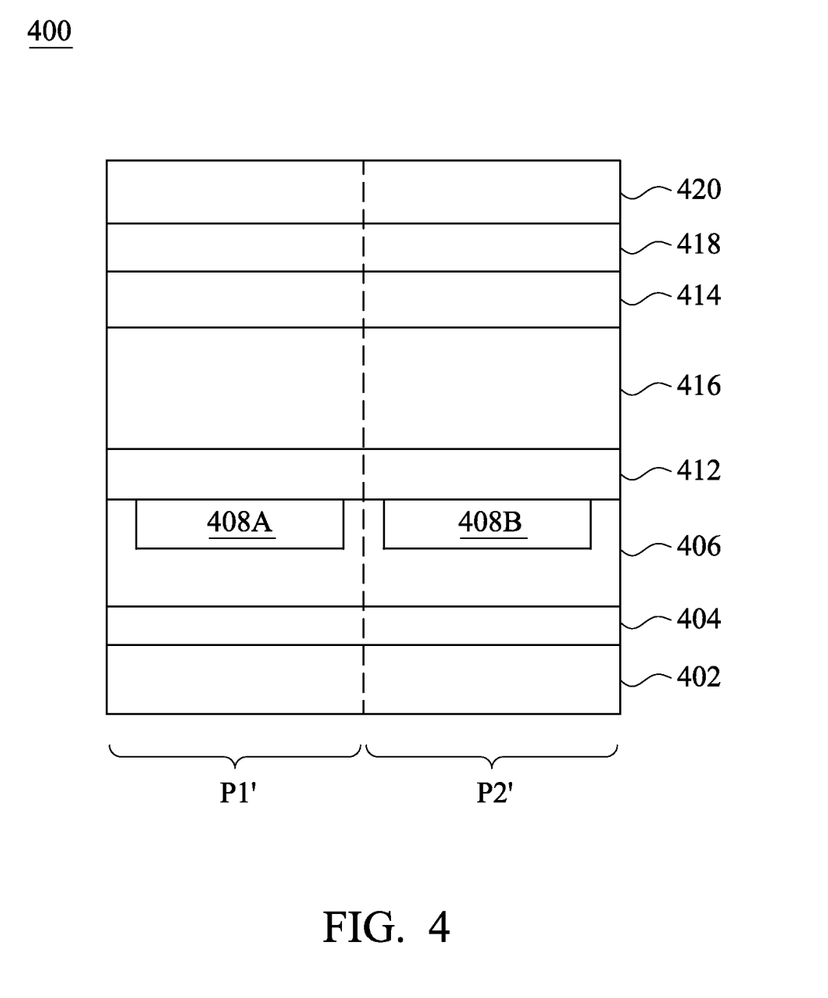
FIG. 4 is a local cross-sectional view of a LCOS display apparatus in accordance with some embodiments.

Similar concepts to the aforementioned embodiments may also be applied in different type LCOS display apparatuses. For example, FIG. 4 is a local cross-sectional view of a LCOS display apparatus 400 in accordance with some embodiments. The LCOS display apparatus 400 is exemplary a time-sequential or scrolling-color type LCOS display apparatus, and is not limited thereto. In FIG. 4, the LCOS display apparatus 400 includes a silicon substrate 402, a reflective layer 404, a dielectric layer 406, pixel electrodes 408A, 408B, a first alignment layer 412, a second alignment layer 414, a liquid crystal layer 416, a common electrode layer 418 and a transparent substrate 420. The silicon substrate 402 includes two pixels P1' and P2' for illustration. The difference between the LCOS display apparatus 400 and the LCOS display apparatus 100 is that the LCOS display apparatus 400 does not have a color filter layer therein. The other components of the LCOS display apparatus 400 are substantially the same as those of the LCOS display apparatus 100, and hence the details thereof are not repeated herein.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A liquid-crystal-on-silicon (LCOS) display apparatus, comprising:
 a silicon substrate having a plurality of pixels arranged in a matrix, wherein each of the plurality of pixels has a tilting angle ranging from substantially 0 degrees to substantially 90 degrees, and each of the plurality of pixels comprises a pixel electrode;
 a color filter layer on the plurality of pixel electrodes, wherein the color filter layer has a plurality of color filter units, and each of the plurality of color filter units respectively corresponds to one of the plurality of pixel electrodes;
 a first alignment layer on the color filter layer;
 a second alignment layer opposite to the first alignment layer; and
 a liquid crystal layer between the first alignment layer and the second alignment layer, wherein the liquid crystal layer has a plurality of liquid crystal molecules with negative dielectric anisotropy, and each of the plurality of liquid crystal molecules has a beta angle substantially equal to 15 degrees and a twist angle of substantially equal to 45 degrees.

2. The LCOS display apparatus of claim 1, wherein the tilting angle of each of the plurality of pixels ranges from substantially 75 degrees to substantially 90 degrees.

3. The LCOS display apparatus of claim 1, wherein the tilting angle of each of the plurality of pixels is substantially 90 degrees.

4. The LCOS display apparatus of claim 1, further comprising:
 a reflective layer on the silicon substrate; and
 a dielectric layer between the reflective layer and the plurality of pixel electrodes.

5. The LCOS display apparatus of claim 1, further comprising:
 a common electrode layer on the second alignment layer; and
 a transparent substrate on the common electrode layer.

6. The LCOS display apparatus of claim 1, wherein each of the plurality of the liquid crystal molecules has a pitch ranging from substantially 20 microns to substantially 100 microns.

7. A liquid-crystal-on-silicon (LCOS) display apparatus, comprising:
 a silicon substrate having a plurality of pixels arranged in a matrix, wherein each of the plurality of pixels has a tilting angle ranging from substantially 0 degrees to substantially 90 degrees, and each of the plurality of pixels comprises a pixel electrode;
 a first alignment layer on the plurality of pixel electrodes;
 a second alignment layer opposite to the first alignment layer;
 a liquid crystal layer between the first alignment layer and the second alignment layer, wherein the liquid crystal layer has a plurality of liquid crystal molecules with negative dielectric anisotropy, and each of the plurality of liquid crystal molecules has a beta angle substantially equal to 15 degrees and a twist angle of substantially equal to 45 degrees.

8. The LCOS display apparatus of claim 7, wherein the tilting angle of each of the plurality of pixels ranges from substantially 75 degrees to substantially 90 degrees.

9. The LCOS display apparatus of claim 7, wherein the tilting angle of each of the plurality of pixels is substantially 90 degrees.

10. The LCOS display apparatus of claim 7, further comprising:
 a reflective layer on the silicon substrate, and
 a dielectric layer between the reflective layer and the plurality of pixel electrodes.

11. The LCOS display apparatus of claim 7, further comprising:
 a common electrode layer on the second alignment layer; and
 a transparent substrate on the common electrode layer.

12. The LCOS display apparatus of claim 7, wherein each of the plurality of the liquid crystal molecules has a pitch ranging from substantially 20 microns to substantially 100 microns.

* * * * *